United States Patent [19]

Allonen

[11] Patent Number: 5,379,652

[45] Date of Patent: Jan. 10, 1995

[54] METHOD AND DEVICE FOR MEASURING THE NIP FORCE AND/OR NIP PRESSURE IN A NIP

[75] Inventor: Harri Allonen, Jyväskylä, Finland

[73] Assignee: Valmet Paper Machinery Inc., Helsinki, Finland

[21] Appl. No.: 121,743

[22] Filed: Sep. 14, 1993

[30] Foreign Application Priority Data

Sep. 16, 1992 [FI] Finland ................... 924138

[51] Int. Cl.⁶ ............................. G01L 5/00
[52] U.S. Cl. ................... 73/862.55; 73/862.541
[58] Field of Search ............... 73/862.044, 862.55, 73/862.68, 862.541

[56] References Cited

U.S. PATENT DOCUMENTS

| | | | |
|---|---|---|---|
| 3,962,911 | 6/1976 | Grenlund | 73/862.55 |
| 4,175,430 | 11/1979 | Morrison et al. | 73/862.55 |
| 4,242,666 | 12/1980 | Reschovsky et al. | 340/870.28 |
| 4,625,568 | 12/1986 | Hartung et al. | 73/862.041 |
| 4,744,253 | 5/1988 | Hermkens | 73/862.55 |
| 4,791,863 | 12/1988 | Vahatalo | 100/35 |
| 4,883,233 | 11/1989 | Saukkonen et al. | 242/66 |
| 4,921,183 | 5/1990 | Saukkonen et al. | 242/66 |
| 5,033,317 | 7/1991 | Van Haag | 73/862.541 |
| 5,043,046 | 8/1991 | Laapotti | 162/358 |

FOREIGN PATENT DOCUMENTS

| | | | |
|---|---|---|---|
| 0538221 | 4/1993 | European Pat. Off. | |
| 914829 | of 0000 | Finland. | |
| 0179622 | 9/1985 | Japan | 73/862.55 |
| 2146774 | 4/1985 | United Kingdom. | |
| 9113337 | 9/1991 | WIPO. | |

OTHER PUBLICATIONS

Soft calender nip: an interesting subject . . . J. Koriseva et al., Paper and Timber, 73 (1991):5.

Patent Abstracts of Japan, JP-A-62165135, vol. 12, No. 2, Jul., 1987.

J. Koriseva, T. Kiema and M. Tervonen, "Soft Calender Nip: an interesting subject for research and measurement", Paperi ja Puu (Paper and Timber) 73 (1991):5.

Primary Examiner—Richard E. Chilcot, Jr.
Assistant Examiner—R. Biegel
Attorney, Agent, or Firm—Steinberg, Raskin & Davidson

[57] ABSTRACT

Method and device for measuring the nip force and/or the nip pressure in a nip formed by a revolving roll or by a corresponding band employed in the manufacture of paper in which measurement detectors are arranged in a series and placed in the transverse direction of the revolving roll, preferably over the entire width of the paper web. The measurement signals of the detectors are passed to a measurement amplifier unit whose connectors are controlled so that, through the measurement amplifier unit, the signal of each measurement detector is passed to a telemeter transmitter placed in connection with the revolving roll. The telemetric messages is transmitted by the telemeter transmitter wirelessly and received by means of a telemeter receiver placed outside the revolving roll. The revolving roll is provided with a transmitter/receiver in proximity to the position of the transmitter receiver placed outside the roll. The transmitter receiver outside the roll is connected to a computer or a corresponding logic unit. Between the transmitter/receivers, a two-way wireless telemetric connection is arranged, and measurement data are transferred through the connection from the roll to the computer, and from the computer, control data for the measurement system and possible calibration data are transferred to the measurement system placed in connection with the roll.

20 Claims, 3 Drawing Sheets

METHOD AND DEVICE FOR MEASURING THE NIP FORCE AND/OR NIP PRESSURE IN A NIP

BACKGROUND OF THE INVENTION

The present invention relates to a method for measuring the nip force and/or the nip pressure in a nip formed, e.g., by a revolving roll or a corresponding band employed in the manufacture of paper by utilizing a series of measurement detectors. The detectors are placed over a certain width in the transverse direction of the revolving roll or the band, preferably over the entire width of the paper web. The measurement signals obtained from the detectors are passed to a measurement amplifier unit having connectors coupled to the detectors. The connectors are controlled through the measurement amplifier unit so that the signal of each measurement detector is passed to a telemeter transmitter placed in connection with the revolving roll or equivalent. The telemetric messages is transmitted by the telemeter transmitter wirelessly and is received by a telemeter receiver placed outside the revolving roll or equivalent.

The present invention also relates to a device for measuring the nip force and/or the nip pressure and the distribution of the same in a nip formed by a revolving roll or by a corresponding band employed in the manufacture of paper. The device comprises a series of detectors placed in connection with the revolving roll or the band, preferably uniformly spaced in the transverse direction of the roll or the band. The device also includes a telemeter transmitter arranged in connection with the revolving roll or the band and to receive the signals obtained from the different measurement detectors. The device also comprises a telemeter receiver arranged in proximity to the telemeter transmitter outside the roll or equivalent for receiving the measurement signals transmitted by the telemeter transmitter without the use of wires, i.e., a wireless connection.

In a number of different stages in the manufacture of paper, various press nips are used through which the paper web is passed. Examples of such nips are roll nips and so-called extended nips in the dewatering press of a paper machine, calendaring nips, and nips in paper winders. The distribution of the pressure in a nip in a dewatering press in the transverse direction, i.e., the direction of the axes of the nip rolls, affects the transverse moisture profile of the web that is being pressed.

It is known in the prior art to use adjustable-crown rolls or so-called Küsters rolls as press rolls because in these rolls, the transverse distribution of the linear load in the press nip can be controlled by means of hydraulic loading members. These members are generally regulated on the basis of regulation signals given by moisture and/or grammage detectors. However, in view of overall control and regulation of the process, it would be extremely important to know the factual values and distributions of the nip pressure both in the transverse direction and in the machine direction. A further piece of information that is important for the control of the nip process is the width of the nip in the direction of running of the web, i.e., in the machine direction, because this information would permit an optimization of the pressing process. This information is also significant for the regulation of the nips in calenders and winders.

As an example of a prior art system for regulating press nips, reference is made to Finnish Patent No. 76,872 (corresponding to U.S. Pat. No. 4,791,863, the specification of which is incorporated by reference herein). The system of measurement in accordance with the present invention is usable, for example, in an environment similar to that described in patent FI 76,872.

In recent years, various so-called extended-nip presses have been introduced and used which are based on press shoes and/or on press belts. In these presses, the width of the press zone in the machine direction is substantially larger than in the roll nips proper. Also, in the case of extended-nip presses, the distribution of the nip pressure in the shoe and/or band nips both in the machine direction and in the transverse direction is an important parameter in view of the control of the pressing process. As one example of an extended-nip presses, reference is made to Finnish Patent No. 82,092 corresponding to U.S. Pat. No. 5,043,046, the specification of which is incorporated by reference herein.

In the prior art, various drum reel-ups are known in which belt support units have been employed in addition to carrier drums. In the reeling of the paper web, it is also important to know the values and distributions of the nip pressure both in the machine direction and in the transverse direction. As examples of drum reel-ups developed by the assignee, and in which the method and the device of the present invention can be used, reference is made to the assignee's Finnish Patent Nos. 81,768 and 81,770, corresponding to U.S. Pat. Nos. 4,921,183 and 4,883,233, respectively, the specifications of which are incorporated by reference herein.

The distribution of the nip force in the machine direction and in the transverse direction is important in the regulation and control of the paper manufacture process. However, it has been practically almost impossible to measure the nip force distribution by means of the prior art methods and devices during paper production operations. Measurement of nip forces from a revolving roll has been carried out under laboratory conditions, in which respect reference is made to an article in the journal Paperi ja Puu - Paper and Timber 73 (1991):5, J. Koriseva, T. Kiema, and M. Tervonen: "Soft Calender Nip: An Interesting Subject for Research and Measurement". In the method described in this paper, a number of detectors were installed on a roll, each of which requires a telemetric equipment of its own and amplifiers of its own. Since the weight of the measurement system consists primarily of the weight of the telemetric equipment (about 1 kilogram per channel), this, together with the high costs of such equipment, imposes a limitation on the number of the measurement channels and detectors in a factual roll in a paper machine or paper finishing machine. As a result of the limited space, it is, in practice, very difficult to fit a number of telemetric devices on a revolving roll in a paper machine or paper finishing machine without alterations in the construction.

Moreover, with respect to the prior art related to the present invention, reference is made to published International Patent Application WO 91/13337 (assigned to Beloit Corp.).

In the prior art methods and devices for measuring nip forces, further problems have developed in the calibration of the detectors as well as in the transfer of the signal from the revolving roll. In a manner known in the prior art, glide rings and equivalent arrangements in addition to telemetric equipment have been used to transfer the signal. However, this structure is complicated and susceptible to disturbances.

In view of eliminating the drawbacks stated above, in the assignee's Finnish Patent Application No. 914829 (Published Pat. Appl. No. 86,771), a method and a device closely related to the present invention are described in which the measurement signals received from the different detectors are passed to a switching unit. The connectors of the switching unit are controlled based on the rotation of the roll or equivalent by means of a pulse generator or equivalent so that, through the switching unit, the signal of each measurement detector is alternatingly connected to a telemeter transmitter placed in connection with the revolving roll or equivalent. By means of the telemeter transmitter, the series of measurement signals are transmitted wirelessly to a stationary telemeter receiver placed outside the revolving roll or equivalent.

FI 914829 describes a method and device for measuring the nip forces and/or the nip pressures and distributions of same in roll and/or band nips employed in the manufacture of paper so that the drawbacks discussed above can be substantially avoided. The measurement method and device of this reference is suitable for on-line measurement of nip forces and/or pressures during production operation. The transfer of the signals from the revolving roll is accomplished in this reference more simply and economically so that the method is suitable for a papermaking environment, which is quite demanding in this respect. The problems related to the location of the detectors on the nip roll or nip band are also substantially eliminated by the device of this reference.

OBJECTS AND SUMMARY OF THE INVENTION

Accordingly, it is an object of the present invention to further develop the method and device of Finnish Patent Application No. 914829 so that the construction of the device, in particular the embodiment of its electronic system, is simpler and easier and more versatile to operate and to carry into effect.

It is a further object of the invention to provide a new and improved system of measurement for use in a paper machine roll and which can be controlled in a simple way from outside the revolving roll so that, in the system, measurement data and, if necessary, also calibration data can be fed from outside the roll into the measurement system and measurement data can be transferred from the roll wirelessly to an outside system. The outside system is preferably provided with various processing and computing programs for the measurement data.

In view of achieving the objects stated above and others, in the method of the present invention, a revolving roll or equivalent press members is provided with a transmitter/receiver to operate in conjunction with another transmitter/receiver placed outside the roll or equivalent in proximity to the transmitter/receiver in the roll. The roll or equivalent band is arranged to form a nip for which a measurement of the nip force and/or nip pressure is desired. The transmitter/receiver exterior to the roll is connected to a PC unit (computer) or to a corresponding logic unit. Between the pair of transmitter/receivers, a two-way wireless telemetric connection is established such that measurement data is transferred from the roll or equivalent to the PC unit or equivalent, and from the PC unit or equivalent, control data for the measurement system and possible calibration data are transferred to the measurement system placed in connection with the roll or equivalent.

In the method, each of the measurement detectors produces a signal corresponding to the force or pressure applied onto the detector. The signals are passed from the detectors through connectors to a measurement amplifier unit. The transmitter/receiver in the roll is connected to the measurement amplifier unit. The detectors are preferably placed over the entire width of a paper web running through the nip over the roll or band. The measurement detectors are PVDF film detectors in which a volt level corresponding to the force or pressure applied onto the detector is produced as the signal. The signals, i.e., the volt level obtained from the detectors, are passed through a switching unit, in which the connectors are arranged, to the transmitter/receiver in the roll and/or to a buffer memory in the measurement amplifier unit.

Further, in the method, the detectors can be calibrated by applying a known force to each detector and measuring the response thus-obtained. The PC unit is preferably arranged, either by manual or computer operation, to give a command to start the measurement, determine the length of the measurement sequence and determine which connector in the switching unit is open/closed at each particular time.

The device in accordance with the present invention includes a first transmitter/receiver placed on the revolving roll or equivalent press members which is in the nip and a second transmitter/receiver arranged outside the roll or equivalent in proximity to first transmitter/receiver. A PC unit or a corresponding logic unit is connected to the second transmitter/receiver. A two-way telemetric connection is established during operation between the transmitter/receivers so that control data for the measurement system can be transferred from the PC or equivalent to a measurement amplifier unit in the roll and measurement data can be transferred from the detectors to the PC unit or equivalent for, e.g., producing the output, and/or further use and processing.

In the present invention, the control of the measurement device and the control of the whole measurement process has been transferred to a PC or an equivalent logic unit connected to a telemeter transmitter/receiver placed outside the roll subjected to the nip-pressure measurement. In this PC unit, a program is stored, which is preferably divided into a measurement-cycle branch and a calibration branch. By using the PC, the operator can choose either the measurement cycle or the calibration cycle, or this choice may also be carried out automatically.

One of the rolls in the nip to be measured is preferably provided with PVDF film detectors which are connected to a measurement amplifier unit. The measurement amplifier unit comprises a charge amplifier, a switching unit, an A/D converter, and a telemeter transmitter/receiver. The wireless telemetric communication between the measurement amplifier unit and the telemeter transmitter/receiver, which is placed outside the roll and connected to the PC, takes place digitally.

In a preferred embodiment of the invention, the power supply to the measurement amplifier unit is placed in connection with the roll and is generated by means of the induction principle, so that the size of the measurement unit can be minimized, which is of great importance in the application concerned.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
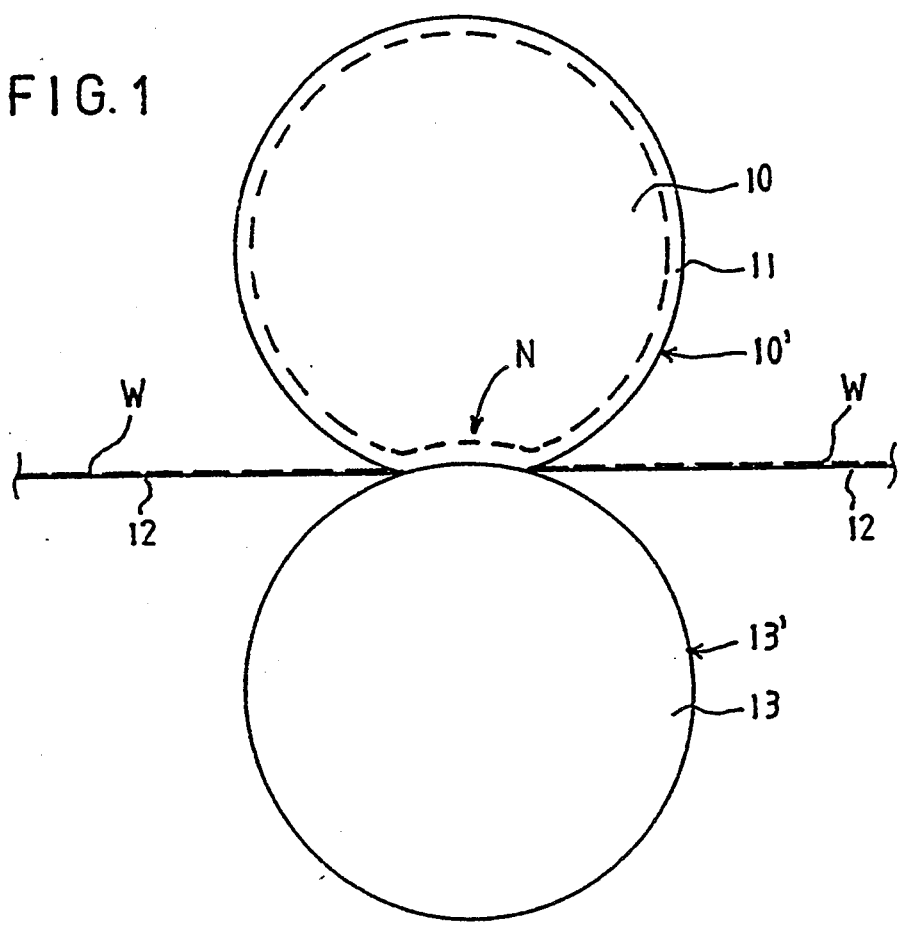
FIG. 1 is a schematic illustration of a press nip in which the present invention can be applied.

FIG. 1 is a schematic illustration of a press nip N in a dewatering press. The nip N is formed between a pair of rolls, upper roll 10 and lower roll 13. A web W is passed into the nip N on a press felt 12 to be dewatered. The upper roll 10 has an elastic coating 11 having a smooth outer face 10'. The lower roll 13 has a hollow face 13' into which water removed from the press felt 12 enters.

Figure 2:
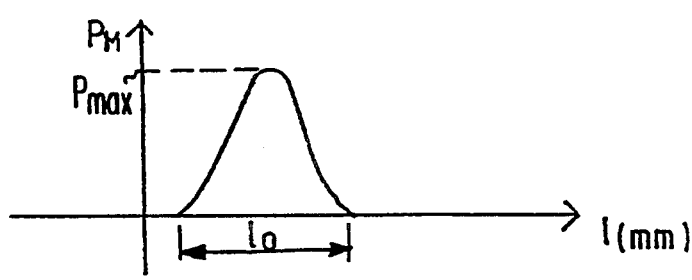
FIG. 2 is a schematic illustration of the distribution of the compression pressure in the machine direction in a press nip as shown in FIG. 1.

FIG. 2 is a schematic illustration of the distribution of compression pressure $P_M$ in the press nip N in the machine direction 1. The compression pressure $P_M$ has a peak value $p_{max}$. The nip N as shown in FIG. 1 may also represent a calendaring nip, in which case a press felt 12 is not used and, for example, roll 13 is a hard-faced roll and roll 10 is a calendaring roll provided with a soft coating, such as a polyurethane coating 11. In such a construction, the nip N is a so-called soft calendaring nip. The length of the felt 12 and web W which are subjected to the pressing in the nip between rolls 10 and 13 as shown in FIG. 1 is denoted with $l_o$.

Figure 3:
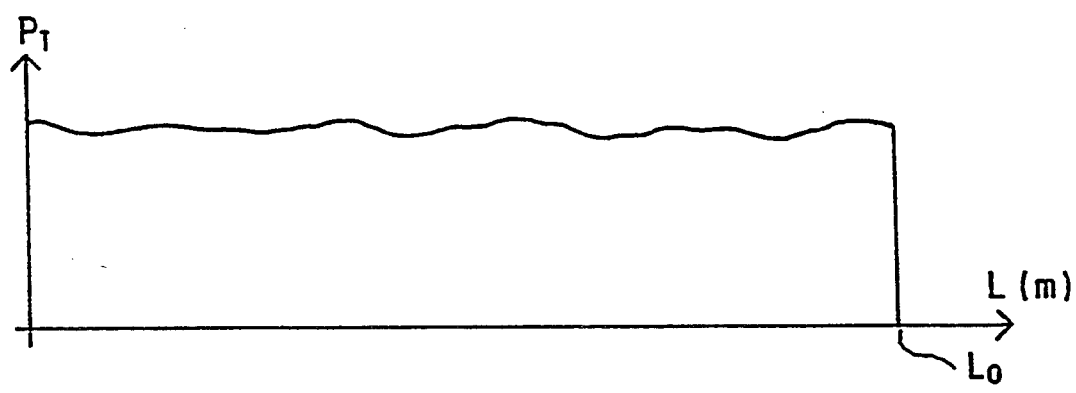
FIG. 3 is a schematic illustration of the distribution of the compression pressure in the transverse direction.

FIG. 3 illustrates the distribution of the compression pressure $P_T$ of the nip N in the transverse direction, i.e., in the axial direction of the rolls 10 and 13. The transverse width of the paper web W and of the nip N is denoted with $L_o$.

The transverse distribution of the compression pressure $P_T$ affects the dry solids content of the web in dewatering presses, the caliper and smoothness of the web in calendaring nips, and the uniformity and the hardness profile of the roll in reeling nips. These are important process parameters which render the distributions $P_M$ and $P_T$ of the nip forces and nip pressures, respectively, important parameters in view of the desired regulation and control of the papermaking process.

Figure 4:
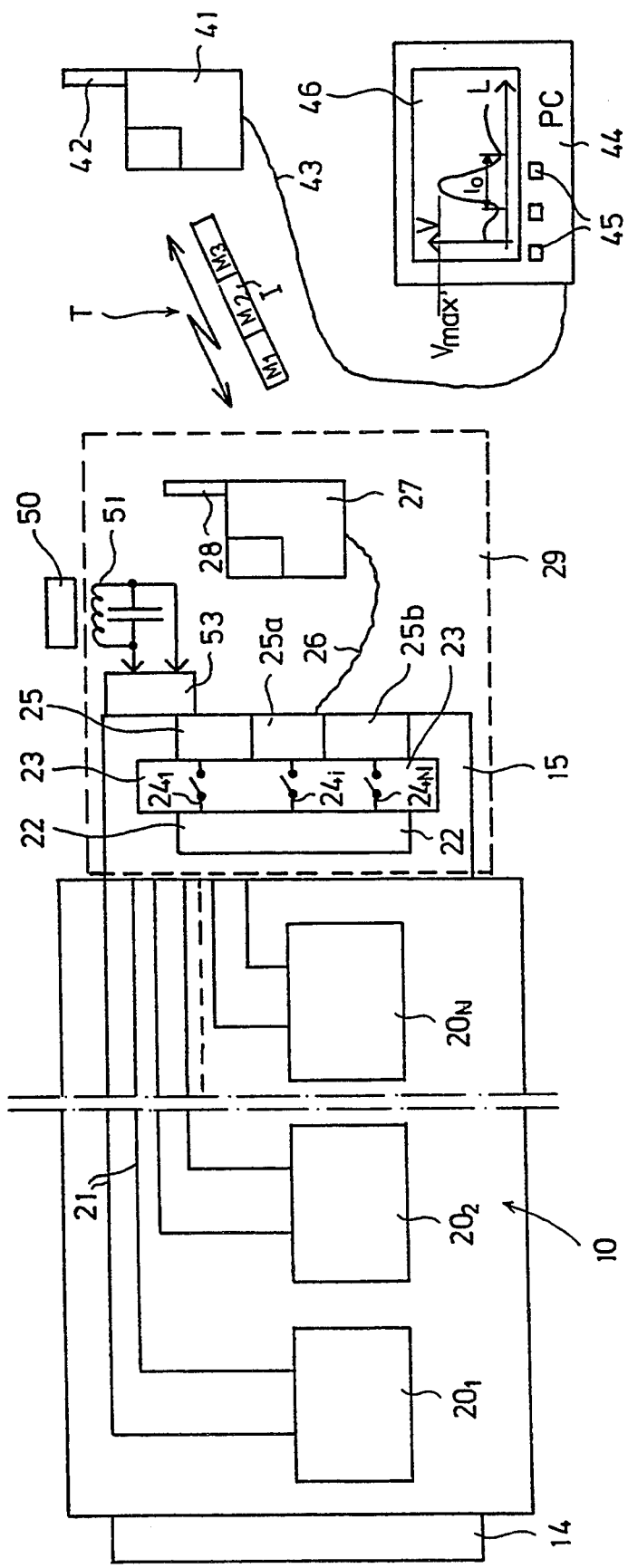
FIG. 4 is a schematic illustration, partly as a block diagram, of the measurement arrangement in accordance with the present invention and used in the method of the present invention.

FIG. 4 is a schematic illustration of the measurement arrangement in accordance with the invention. In the roll 10, which forms the press nip N and is provided with an elastic covering, e.g., polyurethane coating 11, a series 20 of measurement detectors $20_l$, ..., $20_n$ are fitted inside the coating 11, i.e., in the interior of the roll. There are n such detectors in series in the roll. By means of the series of detectors 20, it is possible to measure both the distribution $P_M$ of the nip pressure in the machine direction and the distribution $P_T$ of the nip pressure in the transverse direction. The distribution of the nip pressure in the transverse direction ($P_T$) is measured at n points in the transverse direction. The detectors $20_l$, ..., $20_n$ are preferably uniformly spaced and number generally between about 3 and about 20. The detectors 20 are fixed either directly to the body of the roll 10 or inside the coating 11, e.g., between its layers, or even, in some cases, directly onto an outer face of the roll.

From the detectors $20_i$, the signals are passed along insulated cables 21 to a measurement amplifier unit 29, which contains a charge amplifier 22, a switching unit 23, a processor 25, an A/D converter 25a, a buffer memory 25b, and a transmitter/receiver unit 27. The switching unit 23, which is, e.g., a CMOS-logic, is controlled from outside the roll 10 by means of a separate PC unit 44 so that, when a command arrives from the PC unit 44 at the processor 25, a connector $24_i$ that was closed is opened and a certain connector $24_{i+l}$ that was open is closed. In this manner, the detectors $20_i$ are read alternatingly, in which case only one telemetric measurement channel T is needed.

The detectors $20_i$ can be read either manually, in which case an operator determines which connector $24_i$ is open/closed at each particular time, or automatically, in which case the status of the connector at each particular time is determined under control by a program stored in the PC 44.

Since there is only one measurement channel T in use, the system is sufficiently simple and the size and quantity of electronics at an end 15 of the roll 10, at which the measurement amplifier unit is situated, is minimized. This is highly important in the application concerned in papermaking processes.

The two-way telemetric communication between the PC 44 and the measurement amplifier unit 29 is carried out wirelessly in digital form. The digital transfer of data, as compared with analogical transfer, is advantageous because detrimental interference in the signal level is little and the consumption of power is less. Also, no expensive hardware cost is involved at the side of the PC 44.

The processor 25 of the measurement amplifier unit 29 is connected with an A/D converter 25a and, if necessary, with a buffer memory 25b in which the measurement data obtained from the detectors $20_i$ can be collected. The detectors $20_i$ can be calibrated on the basis of this measurement data by means of a calibration program stored in the PC 44. The processor 25, the related A/D converter 25a, and the buffer memory 25b, if any, are connected via an RS232 bus 26 to a transmitter/receiver 27 having a transmitter/receiver antenna 28. The transmitter/receiver 27 and its antenna 28 are connected to the roll 10.

The transmitter/receiver 27,28 is in wireless telemetric connection T with a transmitter/receiver 41 placed in proximity to the roll, outside the roll. Transmitter/receiver 41 is provided with a transmitter/receiver antenna 42. The telemetric connection T takes place digitally so that the measurement data $M_1$, $M_2$, $M_3$, $M_i$, ..., $M_n$, of each detector $20_i$ are transferred successively as suitable packages I. The telemetric connection T is a two-way connection so that, from the PC unit 44, which is connected to the transmitter/receiver 41,42 via a cable 43, it is possible to give commands to the measurement amplifier unit 29 through its receiver 27.

FIG. 4 shows schematically a keyboard 45 of the PC 44, and its display screen 46 which shows the distribution V(l) of the nip pressure, wherein $V_{max}$ represents the peak voltage of the detectors 20 and $l_o$ represents the length of the nip in the machine direction, i.e., in the running direction of the paper web.

In its simplest form, the supply of electricity to the measurement amplifier unit can be battery operated. In practice, the power supply is preferably accomplished by means of a generator which consists of a permanent magnet 50 installed in a stationary position in proximity to the roll, an induction coil 51 and a capacitance 52 installed in connection with the measurement amplifier unit 29. The capacitance 52 stores the electric charge produced by the generator. When the measurement amplifier unit revolves along with the roll 10, a magnetic field produced by the permanent magnet 50 induces an electromotive force in the induction coil 51, by means of which force the capacitance 52 is charged. The capacitance feeds the necessary voltage through a regulator 53 to the measurement amplifier unit 29. Thus, when the roll 10 revolves, the measurement amplifier unit 29 and the transmitter/receiver 27 constantly receive their necessary operating electricity.

The force or pressure detectors 20 used in the invention are preferably made of PVDF film (PVDF=Polyvinylidenedifluoride), which is a piezo-electric film. Regarding the properties and functioning of this film, reference is made to an article in the journal Prosessori 13/88, J. Koriseva: "Pietsosahkoinen vaihto-ehto" (Piezoelectric alternative). Suitable for the purposes of the invention are, e.g., the PVDF films sold under the trade marks "SOLEF" and "KYNAR", whose thicknesses vary in a range of from about 8 μm to about 40 μm. A PVDF film is a particularly preferred force or pressure detector because, by its construction, a force of just tens of Newtons provides an output voltage of the volt level. Each PVDF detector will provide a volt output which indicates the nip force and/or the nip pressure applied onto that detector.

Figure 5:
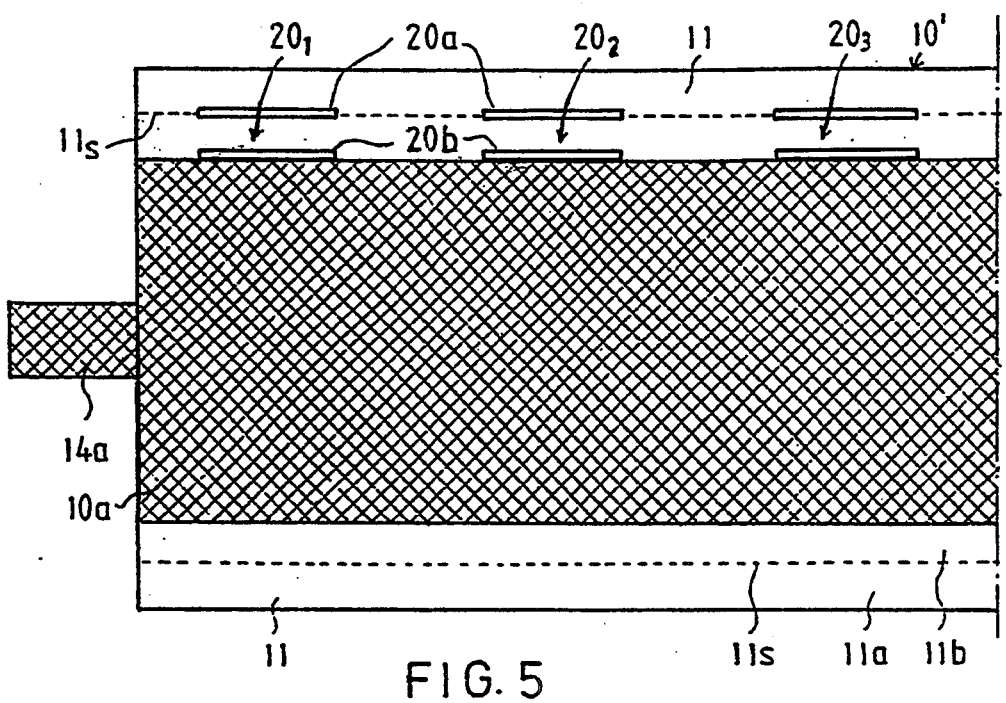
FIG. 5 is an axial sectional view of a press roll provided with an elastic coating and measurement detectors in accordance with the invention.

Referring to FIG. 5, a body part 10a of the roll 10 is provided with an elastic coating 11 made of, e.g., of polyurethane. Axle journals 14,14a are arranged at ends of the rolls 10. The coating 11 is composed of two layers 11a and 11b which are fixed one on top of the other, e.g., by means of an adhesive joint 11s. A series of film detectors 20b are glued onto the cylinder mantle of the roll body 10a. There are n pieces of film detectors which operate as described above and which are arranged to be uniformly spaced in the axial direction. The lower layer 11b of the coating has been fixed onto the film detectors 20b on the cylinder mantle of the roll body 10a. A second series of detectors 20a has been fixed onto the outer face of the lower layer 11b. An outer layer 11a of the coating 11 is arranged on the second series of detectors 20a. The outer layer 11a has a smooth outer face 10' which is placed against the web W in the nip N. The series of detectors 20a and 20b are interchangeable with one another. In practice, the alternative that is easier to control is to place the detectors in accordance with the series 20b, i.e., directly on the roll body.

Figure 6:
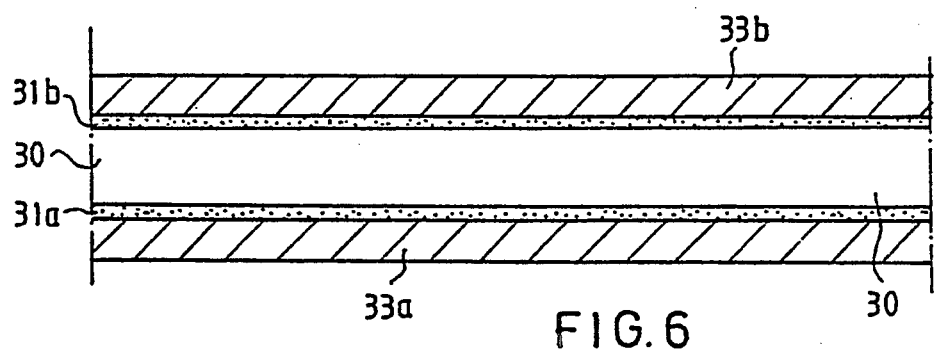
FIG. 6 is a sectional view of a detector made of a piezoelectric PVDF film.
Figure 7:
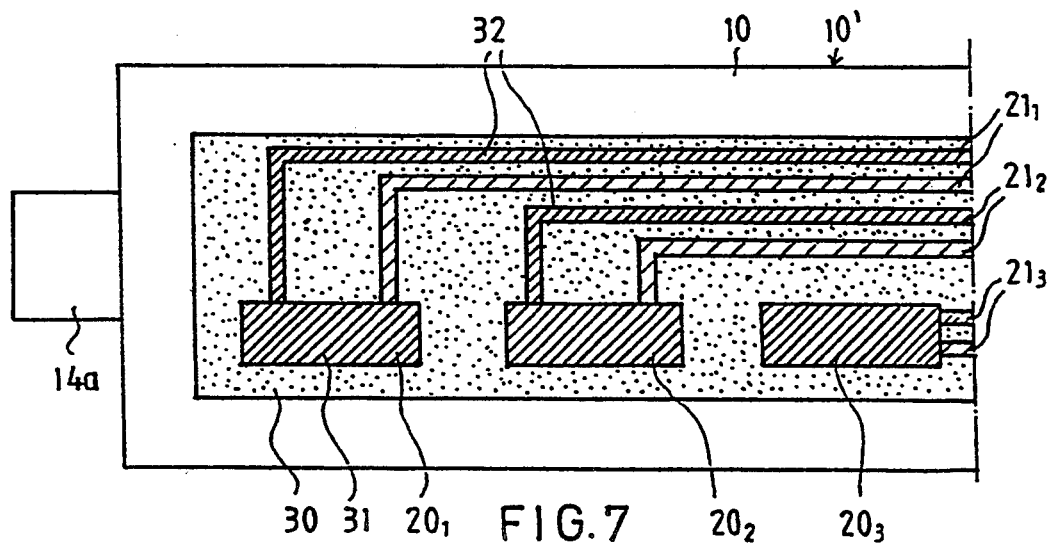
FIG. 7 illustrates a metallizing pattern of PVDF film detectors.

FIG. 6 is a sectional view of an example of a preferred construction of a PVDF film detector 20. The detector comprises a PVDF film 30 having metallizing patterns 31a,31b made, e.g., of aluminum, applied to both sides. On the metallizing patterns 31a,31b, there are layers of protective material 33a,33b which are made, e.g., of Kapton TM. FIG. 6 is a sectional view taken, e.g., in a radial plane of the detector arrangement shown in FIG. 7, which is made of a strip-shaped PVDF film 30. The film strip 30 extends substantially across the entire axial length of the mantle of the roll 10. In another embodiment of the invention, each detector 20 can be manufactured and cabled separately, i.e., out of individual pieces of PVDF film. The areas of the metallizing patterns 31 in the films form the active areas of the detectors $20_l, \ldots, 20_n$, in which the compression forces are measured. The metallizing patterns 31 are connected with strip conductors 32, which are also composed of metallizations applied onto the film strip 30 in the manner shown in FIG. 7.

Cables $21_l, \ldots, 21_n$ consist of strip conductors 32 and are preferably placed so that they enter into the nip N at times different from the times of the active areas proper of the detectors. In this manner, any interference signals arising from deformations in the cables 21 can be filtered off from the measurement signals.

The detectors 20 can be calibrated advantageously by applying a precisely known force to the detectors and examining the response thus obtained. This method is known as a so-called "impact hammer test". The maximum pressure $P_{max}$ in the press nip N is directly proportional to the peak voltage $V_{max}$ of the pulse obtained from the detectors $20_i$ (FIG. 4). The length of the nip in the machine direction lo is proportional to the pulse length, but not necessarily directly proportional, for the interdependence may be non-linear. Moreover, the shape of the pressure distribution $P_M$ corresponds to the shape of the voltage pulse obtained from the detectors $20_i$. The transverse distribution of pressure $P_T$ can be determined on the basis of the peak voltages $V_{max}$ of the series of pulses obtained from the different detectors $20_i$.

When the roll 10 is in the paper machine, in some roll positions it is difficult to use the impact hammer test because of lack of space. In such a case, it is possible to apply calibration by means of the PC 44, for which purpose a separate calibration program has been built-in and stored in the PC 44. By means of this program, the detectors $20_i$ are calibrated at regular intervals. The calibration program can be started either automatically at certain intervals or by the operator manually by the intermediate of the keyboard 45 of the PC 44. If there is sufficient space available around the roll 10, it is also possible to use the impact hammer test.

The display terminal 46 of the PC 44 shows the distribution $P_M$ and $P_T$ of the compression pressure graphically, and possibly also various auxiliary quantities and parameters calculated by the PC 44 as programmed, on the basis of these distributions. The auxiliary quantities and parameters are useful in the control and regulation of the papermaking process. The measurement signals may also be connected to the system of regulation of a paper machine or paper finishing machine, such as a calender or a reel-up to act as feedback signals for a closed regulation system.

The examples provided above are not meant to be exclusive. Many other variations of the present invention would be obvious to those skilled in the art, and are contemplated to be within the scope of the appended claims.

I claim:

1. A method for measuring the force and/or pressure in a press nip in a machine, comprising the steps of:

arranging a revolving first press member with a surface thereof in nip-defining relationship with a second press member, arranging measurement detectors in operative relationship with the surface of the first press member in an axial direction thereof, each of said measurement detectors producing a signal corresponding to a force applied onto said detector, passing the signals from said detectors through respective openable and closeable connectors arranged in a measurement amplifier unit, coupling a first telemeter transmitter/receiver to the first press member, connecting said first telemeter transmitter/receiver to said measurement amplifier unit, arranging a second telemeter transmitter/receiver at a distance from the first press member, to thereby form a two-way wireless telemetric connection between said first transmitter/receiver and said second transmitter/receiver, coupling said second transmitter/receiver to controlling means, passing measurement data from said detectors in the first press member through said connectors in said measurement amplifier unit, said first transmitter/receiver and said second transmitter/receiver to said controlling means, and passing control data and/or calibration data from said controlling means through said second transmitter/receiver and then said first transmitter/receiver to selectively control the opening and closing of said connectors to regulate the flow of measurement data from said detectors.

2. The method of claim 1, further comprising the steps of arranging a paper web to run through the nip over the first press member, and arranging said detectors to extend over the entire width of the paper web.

3. The method of claim 1, wherein said detectors are polyvinylidenedifluoride film detectors in which a volt level corresponding to the force applied onto said detector is produced as the signal.

4. The method of claim 1, further comprising the step of passing the signals obtained from said detectors through a switching unit in said measurement amplifier unit to said first transmitter/receiver, said connectors being arranged in said switching unit, said switching unit enabling measurement data from said detectors to be passed through selected ones of said connectors in accordance with the control data received from said controlling means.

5. The method of claim 1, further comprising the step of passing the signals obtained from said detectors through a switching unit in said measurement amplifier unit to a buffer memory arranged in said measurement amplifier unit, said switching unit enabling measurement data from said detectors to be passed through selected ones of said connectors in accordance with the control data received from said controlling means.

6. The method of claim 5, further comprising passing the signals obtained from said detectors from said buffer memory to said first transmitter/receiver.

7. The method of claim 1, further comprising calibrating said detectors by applying a known force to each of said detectors and measuring the response obtained from said detectors.

8. The method of claim 1, further comprising coupling individual ones of said connectors to individual ones of said detectors, arranging said connectors in a switching unit and controlling the switching unit via said controlling means to thereby individually control each of said detectors.

9. The method of claim 8, further comprising arranging the controlling means to give a command to start the measurement, determine the length of the measurement sequence and determine which one of said connectors in said switching unit is open/closed at each particular time.

10. The method of claim 1, further comprising arranging a buffer memory in said measurement amplifier unit and collecting and storing measurement data from said detectors in said buffer memory.

11. The method of claim 10, further comprising calibrating said detectors by means of a calibration program stored in said controlling means on the basis of the measurement data in said buffer memory.

12. A device for measuring the nip force, the nip pressure and/or the distribution of the nip force or nip pressure in a press nip formed by first and second revolving press members utilized in the manufacture of paper, comprising detectors placed in operative relationship with a surface of the first press member in an axial direction thereof, said detectors detecting a force in a nip formed in part by the first press member and generating a signal based thereon, a first telemeter transmitter/receiver coupled to the first press member, said first transmitter/receiver receiving the signals generated by said detectors, a second telemeter transmitter/receiver spaced from the first press member to form a two-way wireless telemetric connection between said first transmitter/receiver and said second transmitter/receiver through which signals from said detectors are passed, and control means connected to said second transmitter/receiver, control data from said control means being transferred through said second transmitter/receiver and said first transmitter/receiver via the telemetric connection to regulate the flow of measurement data from selected ones of said detectors being transferred via the telemetric connection to said control means.

13. The device of claim 12, further comprising a measurement amplifier unit arranged on the first press member and coupled to said detectors and said first transmitter/receiver, said measurement amplifier unit comprising connectors connected to respective ones of said detectors, the control data being transferred through said measurement amplifier unit to said connectors therein and the measurement data from said detectors being passed through said connectors in said measurement amplifier unit in accordance with the control data received from said control means.

14. The device of claim 12, wherein said detectors are polyvinylidenedifluoride film detectors arranged on an outer face or an outer coating of the first press member and in an axial direction thereof, the first press member having between about 3 and about 20 of said detectors.

15. The device of claim 13, wherein said measurement amplifier unit comprises a charge amplifier, a switching unit connected to said charge amplifier, a processor connected to said switching unit, and an A/D converter connected to said processor, measurement data, control data, and calibration data flowing through said measurement amplifier unit between said connectors and said control means over the telemetric connection digitally and in two directions, said switching unit enabling measurement data from said detectors to be passed through selected ones of said connectors in accordance with the control data received from said control means.

16. The device of claim 15, wherein said measurement amplifier unit further comprises a buffer memory arranged to collect and store measurement data.

17. The device of claim 13, further comprising electric induction means for supplying power to said measurement amplifier unit and to said first transmitter/receiver, said electric induction means comprising a magnet spaced from the first press member, an induction coil arranged in the first press member and facing said magnet, a capacitance unit, said induction coil and said capacitance unit being installed in connection with said measurement amplifier unit such that a magnetic field produced by said magnet upon rotation of the first press member and thus said measurement amplifier unit induces an electromotive force in said induction coil 51 which charges said capacitance unit, and a voltage regulator coupled to said capacitance unit, said capacitance unit feeding voltage through said regulator to said measurement amplifier unit.

18. The device of claim 12, wherein said control means is a computer, said computer being provided with separate measurement controls and calibration controls.

19. The device of claim 12, wherein said detectors are uniformly spaced in an axial direction of the first press member.

20. The device of claim 13, wherein said measurement amplifier unit comprises a switching unit having connectors arranged therein such that individual ones of said connectors connect individual ones of said detectors, the measurement data being passed from said detectors through said connectors to said first transmitter/receiver and then over the telemetric connection to said second transmitter/receiver, said control means controlling said switching unit such that measurement data from said detectors is passed through selected ones of said connectors in accordance with the control data received from said controlling means.

* * * * *